(12) United States Patent
Sharma

(10) Patent No.: US 7,876,325 B1
(45) Date of Patent: Jan. 25, 2011

(54) EFFECT TRANSITIONING BASED ON KEY LOCATIONS IN SPATIAL DIMENSIONS

(75) Inventor: Anchal Sharma, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 901 days.

(21) Appl. No.: 11/757,643

(22) Filed: Jun. 4, 2007

(51) Int. Cl.
*G06T 15/00* (2006.01)

(52) U.S. Cl. .................. 345/473; 345/589; 345/623; 348/143; 382/278; 382/282

(58) Field of Classification Search .................. 345/623, 345/625, 473, 474, 475, 589; 348/143; 382/278, 382/282
See application file for complete search history.

(56) References Cited

U.S. PATENT DOCUMENTS

| | | | |
|---|---|---|---|
| 5,790,769 A | 8/1998 | Buxton et al. | |
| 6,097,853 A | 8/2000 | Gu et al. | |
| 6,392,710 B1 | 5/2002 | Gonsalves et al. | |
| 6,850,249 B1 * | 2/2005 | Gu | 345/623 |
| 6,859,554 B2 | 2/2005 | Porikli et al. | |
| 7,627,168 B2 * | 12/2009 | Hamburg | 382/163 |

OTHER PUBLICATIONS

Nikon Capture NX product brochure, Feb. 2006, Nikon Corporation, http://www.nikonusa.com/fileuploads/pdfs/CaptureNX_Brochure.pdf.

* cited by examiner

*Primary Examiner*—Phu Nguyen
(74) *Attorney, Agent, or Firm*—Robert C. Kowert; Meyertons, Hood, Kivlin, Kowert & Goetzel, P.C.

(57) ABSTRACT

A method, system, and computer-readable storage medium are disclosed for editing an image comprising a first spatial dimension and a second spatial dimension. Input specifying one or more key locations on a first spatial coordinate line may be received. The first spatial coordinate line may correspond to the first spatial dimension of the image, and boundaries for a plurality of partitions of the image may be determined by the one or more key locations on the first spatial coordinate line. Input specifying one or more respective parameter values for an effect at each of the one or more key locations on the first spatial coordinate line may be received. The effect may be automatically applied within each of the plurality of partitions of the image based on the one or more parameter values at the respective boundaries for each of the plurality of partitions.

39 Claims, 6 Drawing Sheets

EFFECT TRANSITIONING BASED ON KEY LOCATIONS IN SPATIAL DIMENSIONS

BACKGROUND

1. Field of the Invention

The present invention is directed to computer systems; and more particularly, it is directed to the editing of digital images and digital video using computer systems.

2. Description of the Related Art

Digital image editing is the process of creating and/or modifying digital images using a computer system. Using specialized software programs, users may manipulate and transform images in a variety of ways. These digital image editors may include programs of differing complexity such as limited-purpose programs associated with acquisition devices (e.g., digital cameras and scanners with bundled or built-in programs for managing brightness and contrast); limited bitmap editors suitable for relatively simple operations such as rotating and cropping images; and professional-grade programs such as Adobe Photoshop®, Adobe Illustrator®, and Adobe AfterEffects® (all available from Adobe Systems, Inc.) with large and complex feature sets.

Digital images may include raster graphics, vector graphics, or a combination thereof. Raster graphics data (also referred to herein as bitmaps) may be stored and manipulated as a grid of individual picture elements called pixels. Suitable image editors may be used to modify pixels (e.g., values such as hue, brightness, saturation, transparency, etc.) on a pixel-by-pixel basis or as a group. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. A black and white bitmap may require less space (e.g., one bit per pixel). Raster graphics are often used for photographs and photo-realistic images.

Vector graphics data may be stored and manipulated as one or more geometric objects. The geometric primitives (e.g., points, lines, polygons, Bézier curves, and text characters) may be based upon mathematical equations to represent parts of digital images. Suitable image editors may be used to perform operations on these objects such as rotation, translation, stretching, skewing, changing depth order, and combining with other objects. Vector graphics are often rasterized, or converted to raster graphics data, in the process of displaying the data on a display device or printing the data with a printer. While raster graphics may often lose apparent quality when scaled to a higher resolution, vector graphics may scale to the resolution of the device on which they are ultimately rendered. Therefore, vector graphics are often used for images that are sought to be device-independent, such as in typesetting and graphic design.

Many digital image editing operations, also referred to herein as effects, may be applied selectively to a portion of the digital image. Using prior approaches, a digital image editor may define a portion of a digital image on which an effect is applied using paths, masks, and selections. A path may comprise a vector description of a line, curve, or enclosed object (e.g., a polygon). A mask may typically comprise any image having a single color channel (e.g., a grayscale image). A selection may represent a region of interest in the digital image and may include one or more pixels (comprising one or more color channels) and/or geometric objects. A selection may be represented by a raster image mask having a single channel indicating per-pixel or per-object membership (full, none, or partial) in the selection. Typically, an effect is applied uniformly (i.e., with fixed parameters) to the path, mask, or selection.

Similarly, digital video comprising a sequence of frames may be edited using suitable authoring programs such as Adobe AfterEffects® and Adobe Flash® (all available from Adobe Systems, Inc.). Using a digital video editor, keyframes in the video may be identified (e.g., on a timeline), and parameter values of an effect may be specified at each of the keyframes. The effect may then be applied in such a way that the effect transitions from the beginning to the end of the sequence of frames, including intermediate frames for which parameter values were not specified by the user. Within each frame, however, the effect is applied uniformly (i.e., with fixed parameters).

SUMMARY

Various embodiments of systems, methods, and computer-readable storage media for editing an image based on one or more key locations in one or more spatial dimensions are disclosed. According to one embodiment, to edit an image comprising at least a first spatial dimension and a second spatial dimension, input specifying one or more key locations on a first spatial coordinate line may be received. The first spatial coordinate line may correspond to the first spatial dimension of the image. Boundaries for a plurality of partitions of the image may be determined by the one or more key locations on the first spatial coordinate line. Input specifying one or more respective parameter values for an effect at each of the one or more key locations on the first spatial coordinate line may be received. The effect may be automatically applied within each of the plurality of partitions of the image based on the one or more parameter values at the respective boundaries for each of the plurality of partitions.

According to one embodiment, parameter values between partition boundaries may be interpolated. Therefore, at points between the key locations, the effect may be applied with intermediate parameter values that are determined by interpolating between the parameter values at the nearest key locations. The interpolation may be linear or non-linear. By using parameter values that vary across a partition, the applied effect may show a transition from one boundary to the other boundary.

According to one embodiment, key-location-based editing may be applied to graphical content comprising a temporal dimension (i.e., digital video comprising a sequence of frames). According to one embodiment, key locations may be specified in two or more dimensions (e.g., spatial and/or, in the case of video, temporal). In applying the effect, parameter values may be determined by a weighted combination of interpolated parameter values from the component dimensions. According to one embodiment, the dimensions may be ordered such that the effects are applied for a first dimension and then to each subsequent dimension in the order. According to one embodiment, each dimension is assigned a priority, and the parameter value used in the applied effect is the value from the dimension with the highest priority.

Figure 1:
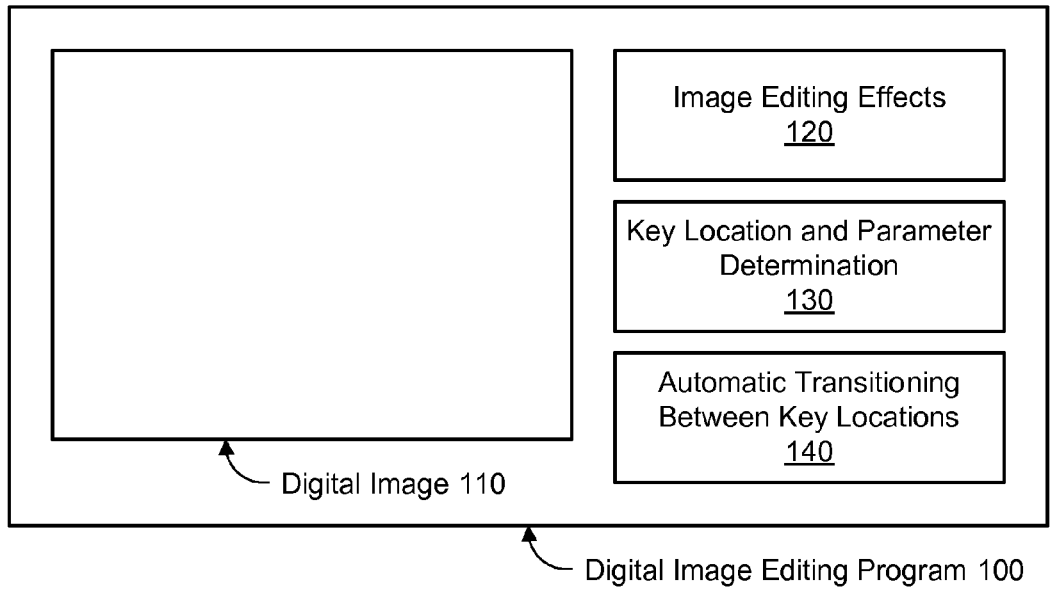
FIG. 1 is a block diagram illustrating one embodiment of a digital image editing program configured for editing an image based on one or more key locations in one or more spatial dimensions.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Various embodiments may provide digital image editing based on one or more key locations in one or more spatial dimensions. Parameter values for an image editing effect may be interpolated between key locations in an image to provide for transitions of the effect within the image. In one embodiment, the key-location-based editing techniques in one or more spatial dimensions may be used in concert with key-frame-based editing techniques in the temporal dimension.

FIG. 1 is a block diagram illustrating one embodiment of a digital image editing program configured for editing an image based on one or more key locations in one or more spatial dimensions. A digital image editing program 100 may be used to create and/or modify a digital image 110. In one embodiment, a digital video editor may be used as the digital editor 100, and the digital image 110 may comprise at least one frame in a digital video. In one embodiment, a suitable product such as Adobe Photoshop®, Adobe Illustrator®, Adobe AfterEffects®, or Adobe Flash® (all available from Adobe Systems, Inc.) may be used as the image editor 100. The image 110 may include a plurality of pixels and/or objects arranged in one or more layers. The image 110 may comprise two spatial dimensions (e.g., in a Cartesian system, the x and y dimensions; in a polar coordinate system, r and θ) or three spatial dimensions (e.g., x, y, and z). In one embodiment, the image 110 may further comprise a temporal dimension (i.e., t) such that the image 110 comprises a sequence of frames intended to be played back over time in a video or animation. The value of any pixel in the image 110 may be considered to be the combination of the constituent values at that pixel in all of the dimensions (e.g., x, y, z, and t) of the image 110.

Figure 9:
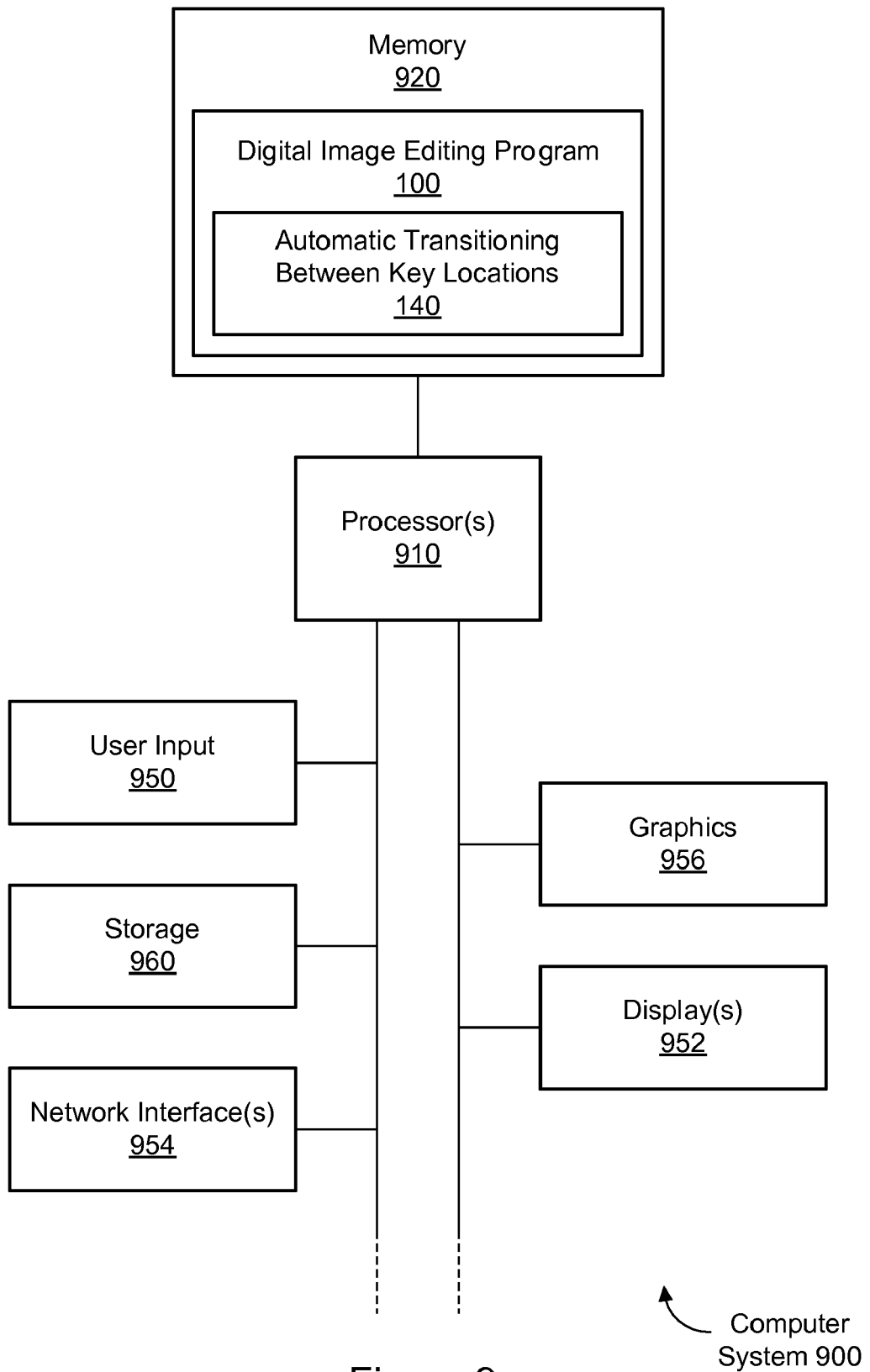
FIG. 9 is a block diagram illustrating constituent elements of a computer system that is configured to implement embodiments of the system and method for editing an image based on one or more key locations in one or more spatial dimensions.

The image editing program 100 may include one or more image editing effects 120. The effects 120 may be applied to all or part of the image 110 to accomplish various aims, typically including modifying the color values and/or alpha values of pixels. An effect may take one or more parameters as input. The outcome of a given effect may vary with varying parameters. As will be discussed in greater detail below, facilities for key location determination and parameter determination 130 may be provided. As will also be discussed in greater detail below, facilities for automatic transitioning between key locations 140 may be provided. The image editing program 100 may be implemented with a graphical user interface (GUI) (including, for example, various windows, display elements, and input elements) to facilitate user interaction with the various types of functionality provided by the image editing program 100. As shown in FIG. 9, the image editing program 100 and its constituent elements (e.g., instructions and data) may be stored in a memory 920 of a computer system 900.

Figure 2:
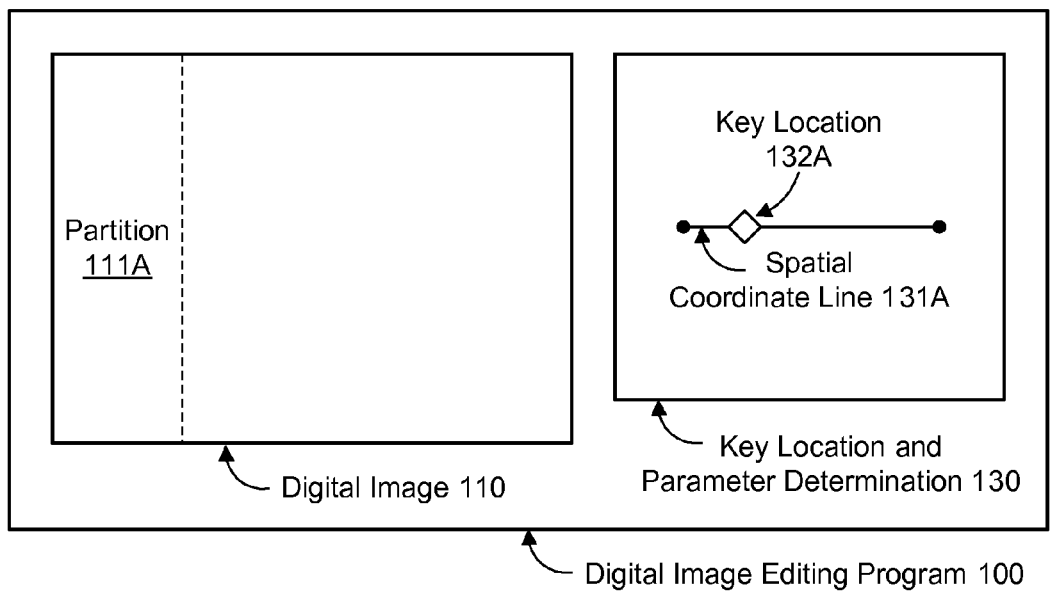
FIG. 2 is a block diagram illustrating one embodiment of a digital image editing program configured for specifying a key location in an image.

FIG. 2 is a block diagram illustrating one embodiment of a digital image editing program configured for specifying a key location in an image. Using the key location and parameter determination facilities 130, a spatial coordinate line 131A may be displayed. The spatial coordinate line 131A may correspond to a particular spatial dimension of the image. In the example shown in FIG. 2, the spatial coordinate line 131A represents the horizontal (x) dimension of an image 110 having at least two spatial dimensions (e.g., horizontal and vertical). However, the techniques discussed below with respect to FIGS. 2 through 5 may also be applicable to spatial coordinate lines representing other spatial dimensions.

Endpoints of the spatial coordinate line 131A may correspond to edges of the corresponding spatial dimension in the image 110. Intermediate points along the spatial coordinate line 131A may correspond to intermediate portions of the image 110. In one embodiment, values on the spatial coordinate line 131A may be represented as percentages (e.g., from 0% to 100%) of the total size (e.g., the length, width, or depth) of the corresponding spatial dimension. Values on the spatial coordinate line 131A may also be represented as absolute values, such as pixel values ranging from zero to the maximum size of the corresponding spatial dimension in pixels.

In one embodiment, the spatial coordinate line 131A may be displayed simultaneously with, but separate and distinct from, the image 110 itself. For example, the spatial coordinate line 131A may be displayed in a different window or sub-window than the image 110 or may otherwise be displayed in a GUI element adjacent to the image 110. In one embodiment, the spatial coordinate line 131A may be superimposed on the image 110. In one embodiment, the spatial coordinate line 131A may displayed in a GUI using suitable GUI elements.

Using the key location and parameter determination facilities 130, a key location 132A may be specified on the on the spatial coordinate line 131A. In one embodiment, the user may interact directly with the spatial coordinate line 131A in a GUI to place the key location 132A via user input. For example, the user may move a slider or other movable GUI element along the line to place the key location 132A. In another embodiment, the user may enter a location value (e.g., expressed as a relative percentage or as an absolute pixel value) into a GUI element such as a dialog box to place the key location 132A on the spatial coordinate line 131A. In yet another embodiment, the position of the key location 132A may be determined by the image editing program 100 by reading a configuration file, reading a saved image file, receiving a request from an external source such as another program, or acquiring data from any other suitable source of input. In one embodiment, the key location 132A may be deleted or modified after being specified.

The key location 132A may be associated with a particular image editing effect from the toolbox of effects 120 provided in the image editing program 100. In various embodiments, the association between the key location 132A and the effect may be established before, during, or after the specification of the key location 132A. For example, if the user selects a blur effect from the image editing effects 120, the GUI associated with the blur effect may include a GUI associated with the key location and parameter determination features 130. In other words, the spatial coordinate line 131A may be displayed only after the effect is selected in one embodiment. In another embodiment, the spatial coordinate line 131A may be displayed prior to the user selection of the blur effect, and the blur effect may be associated with the key location 132A during or after the placement of the key location 132A. In one embodiment, the techniques described herein may be used with any effect that may be suitably applied to a particular spatial dimension.

In one embodiment, one or more parameter values for the effect may be specified by a user and associated with the key location 132A. In the example of the blur effect, the parameters may include a kernel size or blur radius. The parameter values may be specified using typical techniques for data entry such as the use of GUI elements, reading saved image files, etc. In one embodiment, a parameter value may be determined when the user confirms the use of a default parameter value associated with the effect. In various embodiments, the one or more parameter values may be entered before, during, or after the placement of the corresponding key location 132A on the spatial coordinate line 131A. In one embodiment, the parameter values may be modified after being specified.

The position of the key location 132A may determine, at least in part, one or more partitions of the image 110. As shown by way of example in FIG. 2, the placement of the key location 132A may determine the boundaries of a first partition 111A. Because the key location 132A is the first key location to be placed on the spatial coordinate line 131A, the boundaries of the first partition 111A include the left-hand vertical edge of the image 110 and a vertical line perpendicular to the position on the horizontal spatial dimension corresponding to the key location 132A on the spatial coordinate line 131A. The first partition 111A may be further divisible into two or more other partitions by the placement of another key location to the left of the existing key location 132A on the spatial coordinate line 131A. In one embodiment, a line representing a partition boundary may be superimposed on the image 110. If the key location 132A is represented by a movable element such as a slider, the line representing the partition boundary may dynamically move across the image 110 to indicate movement of the key location 132A.

Figure 3:
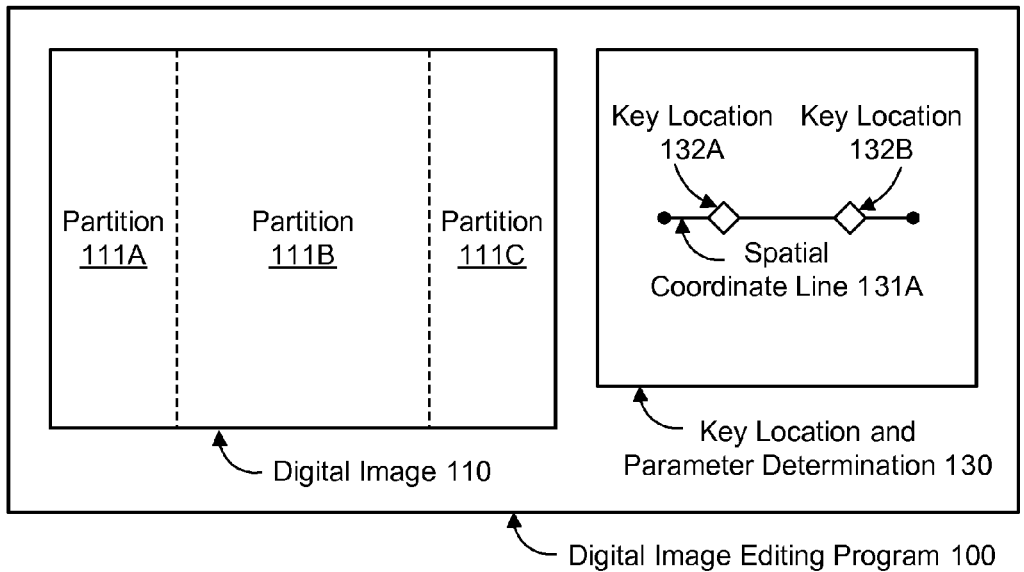
FIG. 3 is a block diagram illustrating one embodiment of a digital image editing program configured for specifying another key location in an image.

FIG. 3 is a block diagram illustrating one embodiment of a digital image editing program configured for specifying another key location in an image. As is described above with respect to the first key location 132A, a second key location 132B may be placed on the spatial coordinate line 131A. The placement of the second key location 132B may determine one or more additional partitions 111B and 111C. In the example shown in FIG. 3, the boundaries of the right-most partition 111C include the right-hand vertical edge of the image 110.

In one embodiment, all existing key locations may be simultaneously displayed along the spatial coordinate line 131A. In one embodiment, only a new key location may be displayed on the spatial coordinate line 131A while its placement is in progress, and previously placed key locations may be displayed on a similar but distinct line also corresponding to the same spatial dimension of the image 110. In another embodiment, the existing key locations may be displayed on the spatial coordinate line 131A, and a key location whose placement is in progress may be displayed on a similar but distinct line until its placement is finalized.

Figure 4:
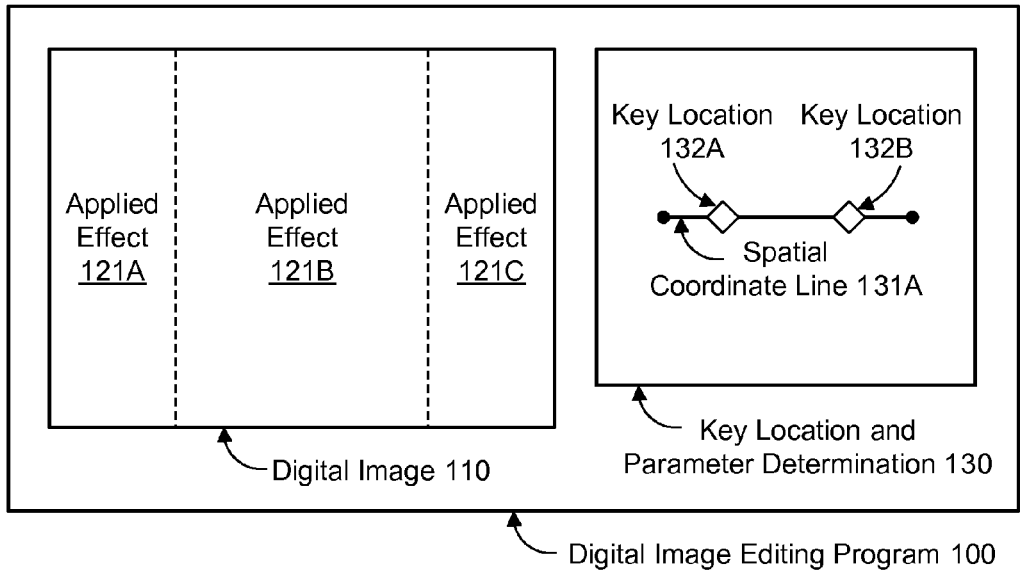
FIG. 4 is a block diagram illustrating one embodiment of a digital image editing program configured for applying an effect to an image based on a plurality of key locations in a spatial dimension.

Based on the placement of the key locations 132A and 132B and the resulting partitions 111A, 111B, and 111C, the effect associated with the key locations 132A and 132B may be applied to the image 110. FIG. 4 is a block diagram illustrating one embodiment of a digital image editing program configured for applying an effect to an image based on a plurality of key locations in a spatial dimension. At points on the partition boundaries internal to the image 110 (i.e., at points corresponding to the key locations), the effect may be applied with the one or more parameter values associated with the respective key location. At points between the key locations, the effect may be applied with intermediate parameter values that are determined by interpolating between the parameter values at the nearest key locations. Parameter values between the key location 132A and the key location 132B may be interpolated between the parameter values associated with those key locations. By using parameter values that vary across the partition 111B, the applied effect 121B may vary as well. The applied affect 121B may therefore show a transition from one vertical boundary to the other vertical boundary.

In one embodiment, the effect transition may be linear. In one embodiment, the effect transition may be non-linear. Non-linear transitions may be implemented by finding intermediate values for the parameter according to a function table. The function table may be determined by user input to a graph editor. In one embodiment, a non-linear transition may be controlled by velocities associated with adjacent key locations.

In one embodiment, the parameter values associated with the right-most key location 132A may be extended in a constant or fixed manner to the right-hand vertical edge of the image, and the parameter values associated with the left-most key location 132B may similarly be extended to the left-hand vertical edge of the image. Therefore, the applied effect 121A may be based on a first set of constant parameter values, and the applied effect 121C may be based on a second set of constant parameter values. In another embodiment, a different form of default behavior may be selected by the user for determining parameter values near the edges of the image 110. The specification of key locations at an endpoint of the spatial coordinate line 131A may act to override this default behavior for the corresponding side of the image 110.

For example, the selected effect may be a blur effect that has a radius parameter (e.g., with higher numbers indicating a blurrier image and lower numbers indicating a sharper image). At the first key location 132A, the parameter value may be specified as 7. At the second key location 132B, the parameter value may be specified as 0. In this example, the blur effect 121A may be uniformly applied throughout the left-hand partition 111A with the radius value of 7. The blur effect 121B may be applied to the middle partition 111B with the radius value varying from 7 to 0 to indicate a transition of the effect. In various embodiments, the transition may be linear or non-linear (e.g., as specified by the user). The blur effect 121C may be uniformly applied throughout the right-hand partition 111C with a radius value of 0.

In one embodiment, the effect may be applied only after the user instructs the image editing program 100 to apply the effect, e.g., after all desired key locations and their associated parameter values have been specified. In another embodiment, the effect or a preview thereof may be applied to the image 110 dynamically as each key location and its associated parameter values are specified.

Figure 5:
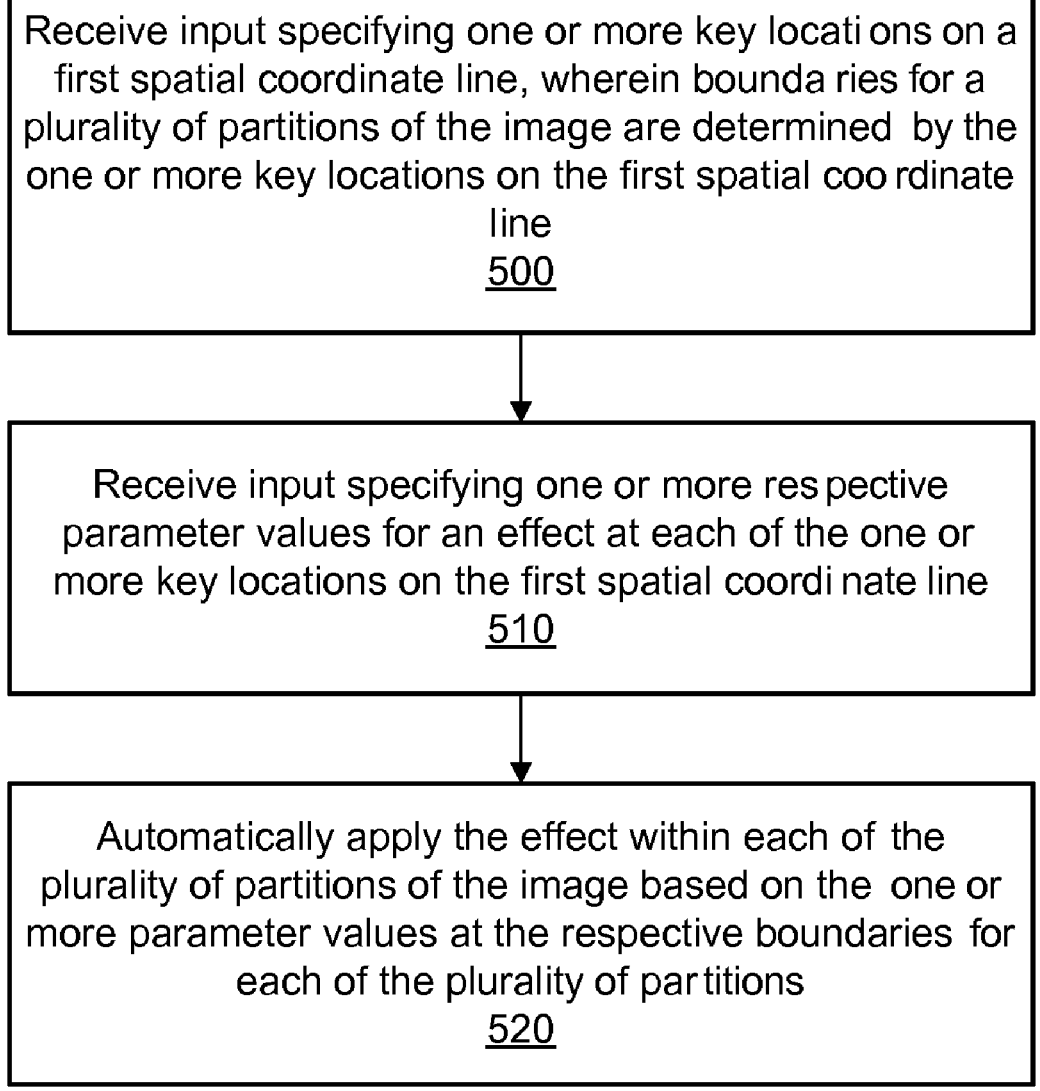
FIG. 5 is a flow diagram illustrating one embodiment of a method for editing an image based on one or more key locations in a spatial dimension.

FIG. 5 is a flow diagram illustrating one embodiment of a method for editing an image based on one or more key locations in a spatial dimension. As shown in block 500, input may be received that specifies one or more key locations on a first spatial coordinate line, as discussed above with respect to FIG. 2. The first spatial coordinate line corresponds to a first spatial dimension of the image. As discussed above with respect to FIGS. 2 and 3, boundaries for a plurality of partitions of the image may be determined by the one or more key locations on the first spatial coordinate line. As shown in block 510, input may be received that specifies one or more respective parameter values for an effect at each of the one or more key locations on the first spatial coordinate line, as discussed above with respect to FIG. 2. In various embodiments, the operations shown in blocks 500 and 510 may be performed in a different order or substantially simultaneously.

As shown in block 520, the effect may be applied within each of the plurality of partitions of the image based on the one or more parameter values at the respective boundaries for each of the plurality of partitions, as discussed above with respect to FIG. 4. The effect may be applied automatically by an image editing program 100, e.g., after receiving a user instruction to apply the effect. Automatically applying the effect may comprise determining intermediate parameter values between the respective boundaries for each of the plurality of partitions. The intermediate parameter values may be determined by linearly or non-linearly interpolating the values at the boundaries for each of the plurality of partitions.

Figure 6:
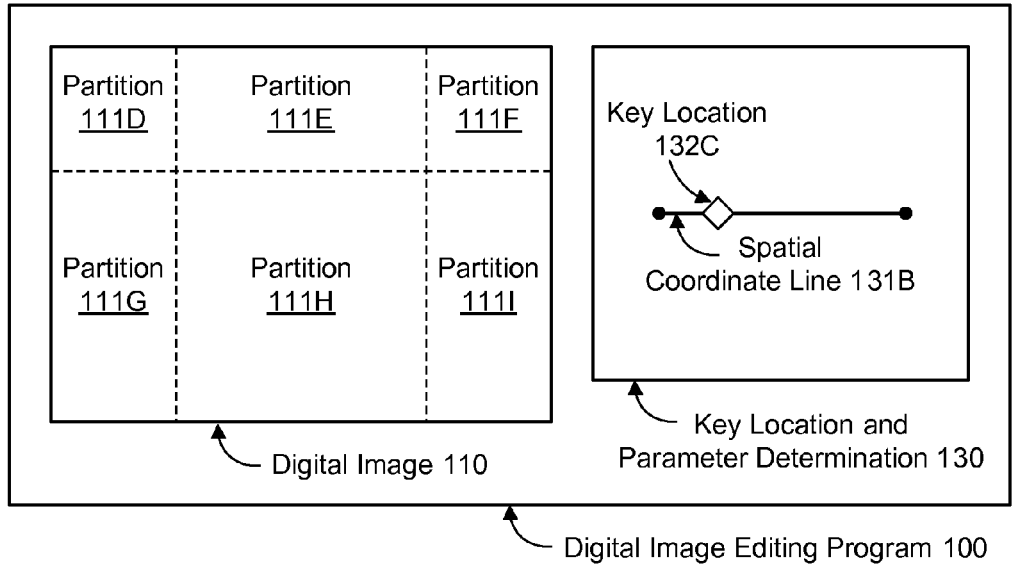
FIG. 6 is a block diagram illustrating one embodiment of a digital image editing program configured for specifying a key location in a second spatial dimension of an image.

FIG. 6 is a block diagram illustrating one embodiment of a digital image editing program configured for specifying a key location in a second spatial dimension of an image. Using the key location and parameter determination facilities 130, a second spatial coordinate line 131B may be displayed. The second spatial coordinate line 131B may correspond to a second spatial dimension of the image. In the example shown in FIG. 6, the second spatial coordinate line 131B represents the vertical (y) dimension of an image 110 having at least two spatial dimensions (e.g., horizontal and vertical). The second spatial coordinate line 131B may be implemented in a manner similar to that of the first spatial coordinate line 131A as discussed with respect to FIGS. 2 and 3. In one embodiment, the second spatial coordinate line 131B may be displayed at the same time as the first spatial coordinate line 131A.

In one embodiment, a two-dimensional key location may be specified. The two-dimensional key location may specify a location in two spatial dimensions (e.g., x and y). To create a two-dimensional key location, both the first spatial coordinate line 131A and the second spatial coordinate line 131B may be used at once. Like a one-dimensional key location, a two-dimensional key location may be associated with one or more parameter values for an effect.

Continuing the example shown in FIGS. 2 and 3, a key location 132C may be placed on the second spatial coordinate line 131B. In one embodiment, additional key locations (not shown) may be placed at the endpoints of the second spatial coordinate line 131B for further control of the effect. As discussed with respect to FIG. 2, one or more parameter values for an effect associated with the key location 132C may be specified by a user for the key location 132A. The specification of the key location 132C may further divide the three partitions previously discussed into the six partitions 111D, 111E, 111F, 111G, 111H, and 111I shown in FIG. 6. As discussed above with respect to the first spatial coordinate line 131A, additional key locations placed on the second spatial coordinate line 131B may further subdivide the image 110.

Figure 7:
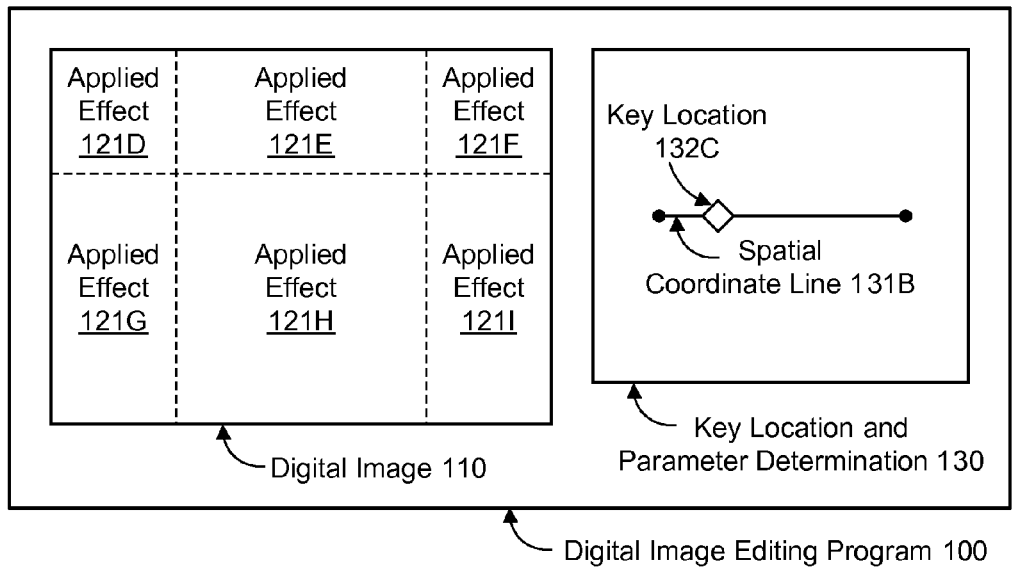
FIG. 7 is a block diagram illustrating one embodiment of a digital image editing program configured for applying an effect to an image based on a plurality of key locations in two spatial dimensions.

Based on the placement of the key locations 132A, 132B, and 132C and the resulting partitions 111D, 111E, 111F, 111G, 111H, and 111I, the effect associated with the key locations may be applied to the image 110. FIG. 7 is a block diagram illustrating one embodiment of a digital image editing program configured for applying an effect to an image based on a plurality of key locations in two spatial dimensions. After determining intermediate parameter values by interpolating between values at the partition boundaries in two spatial dimensions, the effect may be applied in various ways to the respective partitions (e.g., creating applied effects 121D, 121E, 121F, 121G, 121H, and 121I) to create effect transitions in two spatial dimensions.

In one embodiment, each of the two spatial dimensions may be assigned a relative weight to control the interpolation of parameter values in two dimensions. The weight of each spatial dimension (i.e., of each corresponding spatial coordinate line) may be assigned to each key location and its respective parameter values in the interpolation. For example, the horizontal dimension may be assigned a weight, labeled herein as $w_x$, and the vertical dimension may be assigned a weight, labeled herein as $w_y$. The value of a parameter at a particular pixel at location (x', y') may be determined as a weighted combination of its interpolated dimensional component values, labeled herein as $v_x'$ and $v_y'$. If the particular pixel lies between two key locations $k_1$ and $k_2$ having respective parameter values of $v_1$ and $v_2$ on the horizontal dimension, and $f(\ )$ is the interpolating function (if the interpolation is linear, then $f(t)=t$), then:

$$v_x'=v_1*(1-f(t))+v_2*f(t), \text{ where } t=(x'-k_1)/(k_2-k_1)$$

Similarly, if the particular pixel lies between two key locations $k_3$ and $k_4$ having respective parameter values of $v_3$ and $v_4$ on the horizontal dimension, then:

$$v_y'=v_3*(1-f(t))+v_4*f(t), \text{ where } t=(y'-k_3)/(k_4-k_3)$$

The final parameter value v for the pixel at (x', y') may be determined as a weighted combination:

$$v=(w_x*v_x'+w_y*v_y')/(w_x+w_y)$$

In one embodiment, a polar coordinate system may be selected based on a user preference and/or suitability of the coordinate system to a particular image. If a polar coordinate system is used, then similar calculations may be performed as follows:

$$r_x=r_1*(1-f(t))+r_2*f(t), \text{ where } t=(r_x-k_1)/(k_2-k_1)$$

$$\theta=\theta_1*(1-f(t))+\theta_2*f(t), \text{ where } t=(\theta-k_3)/(k_4-k_3)$$

Figure 8:
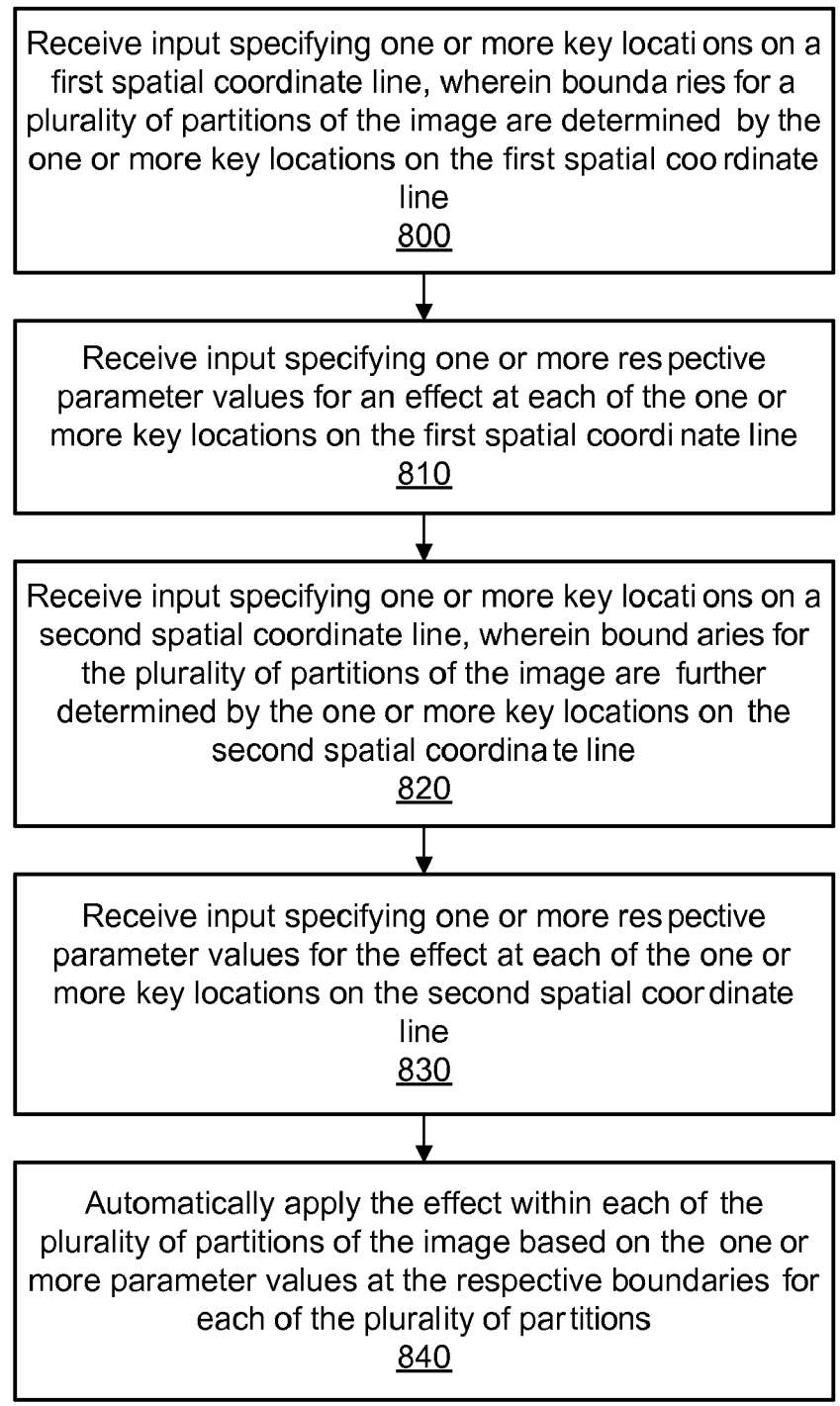
FIG. 8 is a flow diagram illustrating one embodiment of a method for editing an image based on one or more key locations in two spatial dimensions.

FIG. 8 is a flow diagram illustrating one embodiment of a method for editing an image based on one or more key locations in two spatial dimensions. As shown in block 800, input may be received that specifies one or more key locations on a first spatial coordinate line, as discussed above with respect to FIG. 2. The first spatial coordinate line corresponds to a first spatial dimension of the image. As discussed above with respect to FIGS. 2, 3, and 6, boundaries for a plurality of partitions of the image may be determined, at least in part, by the one or more key locations on the first spatial coordinate line. As shown in block 810, input may be received that specifies one or more respective parameter values for an effect at each of the one or more key locations on the first spatial coordinate line, as discussed above with respect to FIG. 2.

As shown in block 820, input may be received that specifies one or more key locations on a second spatial coordinate line, as discussed above with respect to FIG. 6. The second spatial coordinate line corresponds to a second spatial dimension of the image. As discussed above with respect to FIGS. 2, 3, and 6, boundaries for a plurality of partitions of the image may be further determined, at least in part, by the one or more key locations on the second spatial coordinate line. As shown in block 830, input may be received that specifies one or more respective parameter values for an effect at each of the one or more key locations on the second spatial coordinate line, as discussed above with respect to FIGS. 2 and 6. In various embodiments, the operations shown in blocks 800, 810, 820, and 830 may be performed in a different order or substantially simultaneously.

As shown in block 840, the effect may be applied within each of the plurality of partitions of the image based on the one or more parameter values at the respective boundaries for each of the plurality of partitions, as discussed above with respect to FIG. 4. The effect may be applied automatically by an image editing program 100, e.g., after receiving a user instruction to apply the effect. Automatically applying the effect may comprise determining intermediate parameter values between the respective boundaries for each of the plurality of partitions. The intermediate parameter values may be determined by linearly or non-linearly interpolating the values at the boundaries for each of the plurality of partitions, as discussed above with respect to FIGS. 4 and 7.

In one embodiment, the image 110 may comprise three spatial dimensions (e.g., the x, y, and z dimensions). Using techniques similar to those described above, input may specify one or more key locations and associated parameter values on a third spatial coordinate line that corresponds to the third spatial dimension of the image. The boundaries for the partitions of the image may be further determined by the one or more key locations on the third spatial coordinate line. The value of a parameter at a particular pixel at location (x', y', z') may be determined as a weighted combination of its interpolated dimensional component values $v_x'$, $v_y'$, and $v_z'$.

In one embodiment, the image 110 may be one frame in a sequence of frames such that the sequence comprises digital video. The digital video may comprise a temporal dimension in addition to two or three spatial dimensions. Using conventional techniques for editing digital video using a timeline, key locations in time may be specified as keyframes on the timeline. Using techniques similar to those described above, the key locations in the temporal dimension may be combined with the key locations in one or more spatial dimensions to create effect transitions both in the spatial and/or temporal dimensions. In one embodiment, the user may switch between a digital image editing interface for editing in the spatial dimensions and a digital video editing interface for editing in the temporal dimension. In one embodiment, the digital video may be conceived as a stack of frames, where the temporal dimension passes from the top to the bottom of the stack (or vice versa). While editing in a spatial dimension, slices from a plurality of frames may be viewed side by side.

As an alternative to the weighting of dimensions, other techniques may be used to resolve conflicts. In one embodiment, the dimensions may be ordered such that the effects are applied for a first dimension as discussed with respect to FIG. 4, then to each subsequent dimension in the order. The output after applying the effect in one dimension may be used as the input for application of the effect in the next dimension. In another embodiment, each of a plurality of dimensions (e.g., the various spatial dimensions and an optional temporal dimension) may be assigned a relative priority. The priority of each dimension may be assigned to each key location and its respective parameter values in the interpolation. In one embodiment, the parameter value used in the applied effect is the value from the dimension with the highest priority.

In one embodiment, a mask may be applied to the image 110 to restrict a spatial scope of the effect (e.g., to a desired region). In one embodiment, particular key locations may be designated as hold-key locations to maintain parameter values for more controlled effect transitions. In one embodiment, while editing in one dimension (e.g., spatial or temporal), the user may specify transformations (e.g., scale, rotate, offset) for other dimensions. While editing the x dimension, for example, the y dimension of the image may stretched over a range of x values. If the temporal dimension is transformed in a similar manner, then pixels from the same region but separated in time may be visible in a single frame.

FIG. 9 is a block diagram illustrating constituent elements of a computer system 900 that is configured to implement embodiments of the system and method for editing an image based on one or more key locations in one or more spatial dimensions. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows™ from Microsoft Corporation, MacOS™ from Apple Corporation, or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a graphics processing unit (GPU). Additionally, the computer system 900 may include one or more displays 952. In one embodiment, the display(s) 952 may be coupled to the graphics component 956 for display of data provided by the graphics component 956.

Program instructions that may be executable by the processor(s) 910 to implement aspects of the techniques described herein (e.g., for rendering artwork including semitransparent surfaces) may be partly or fully resident within the memory 920 at the computer system 900 at any point in time. The program instructions may include, for example, a digital image editing program 100 and functionality for automatic transitioning between key locations 140 as described above. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 9, as illustrated by the ellipsis shown.

In various embodiments, the elements shown in FIGS. 5 and 8 may be performed in a different order than the illustrated order. In FIGS. 5 and 8, any of the operations described in the elements may be performed programmatically (i.e., by a computer according to a computer program). In FIGS. 5 and 8, any of the operations described in the elements may be performed automatically (i.e., without user intervention).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for editing an image comprising a first spatial dimension and a second spatial dimension, the method comprising:
performing by a computer:
displaying a first spatial coordinate line, wherein the first spatial coordinate line corresponds to the first spatial dimension of the image;
receiving input specifying one or more key locations on the first spatial coordinate line, wherein boundaries for a plurality of partitions of the image are determined by the one or more key locations on the first spatial coordinate line;
receiving input specifying one or more respective parameter values for an effect at each of the one or more key locations on the first spatial coordinate line; and
automatically applying the effect within each of the plurality of partitions of the image based on the one or more parameter values at the respective boundaries for each of the plurality of partitions.

2. The method as recited in claim 1, wherein automatically applying the effect within each of the plurality of partitions of the image further comprises determining intermediate parameter values between the respective boundaries for each of the plurality of partitions.

3. The method as recited in claim 1, wherein, in automatically applying the effect within each of the plurality of partitions of the image based on the one or more parameter values at the respective boundaries for each of the plurality of partitions, the one or more parameter values are linearly interpolated between the respective boundaries for each of the plurality of partitions.

4. The method as recited in claim 1, wherein, in automatically applying the effect within each of the plurality of partitions of the image based on the one or more parameter values at the respective boundaries for each of the plurality of partitions, the one or more parameter values are non-linearly interpolated between the respective boundaries for each of the plurality of partitions.

5. The method as recited in claim 1, further comprising:
receiving input specifying one or more key locations on a second spatial coordinate line, wherein the second spatial coordinate line corresponds to the second spatial dimension of the image, and wherein the boundaries for the plurality of partitions of the image are further determined by the one or more key locations on the second spatial coordinate line; and
receiving input specifying one or more respective parameter values for the effect at each of the one or more key locations on the second spatial coordinate line.

6. The method as recited in claim 5, wherein, in automatically applying the effect within each of the plurality of partitions of the image based on the one or more parameter values at the respective boundaries for each of the plurality of partitions, the parameter values at each of the one or more key locations on the first spatial coordinate line are assigned a different weight than the parameter values at each of the one or more key locations on the second spatial coordinate line.

7. The method as recited in claim 5, wherein, in automatically applying the effect within each of the plurality of partitions of the image based on the one or more parameter values at the respective boundaries for each of the plurality of partitions, the parameter values at each of the one or more key locations on the first spatial coordinate line are assigned a different priority than the parameter values at each of the one or more key locations on the second spatial coordinate line.

8. The method as recited in claim 1, wherein the image comprises a third spatial dimension.

9. The method as recited in claim 8, further comprising:
receiving input specifying one or more key locations on a third spatial coordinate line, wherein the third spatial coordinate line corresponds to the third spatial dimension of the image, and wherein the boundaries for the plurality of partitions of the image are further determined by the one or more key locations on the third spatial coordinate line; and
receiving input specifying one or more respective parameter values for the effect at each of the one or more key locations on the third spatial coordinate line.

10. The method as recited in claim 1, wherein the image comprises a frame in a digital video, wherein the digital video comprises a temporal dimension.

11. The method as recited in claim 10, further comprising:
receiving input specifying one or more keyframes on a timeline, wherein the timeline corresponds to the temporal dimension, and wherein the boundaries for the plurality of partitions of the image are further determined by the one or more keyframes on the timeline; and
receiving input specifying one or more respective parameter values for the effect at each of the one or more keyframes on the timeline.

12. The method as recited in claim 1, further comprising:
applying a mask to the image to restrict a spatial scope of the effect.

13. The method as recited in claim 1, further comprising:
displaying the image and the first spatial coordinate line substantially simultaneously on one or more display devices.

14. A computer-readable, non-transitory storage medium, comprising program instructions for editing an image comprising a first spatial dimension and a second spatial dimension, wherein the program instructions are computer-executable to implement:
displaying a first spatial coordinate line, wherein the first spatial coordinate line corresponds to the first spatial dimension of the image;

receiving input specifying one or more key locations on the first spatial coordinate line, wherein boundaries for a plurality of partitions of the image are determined by the one or more key locations on the first spatial coordinate line;

receiving input specifying one or more respective parameter values for an effect at each of the one or more key locations on the first spatial coordinate line; and automatically applying the effect within each of the plurality of partitions of the image based on the one or more parameter values at the respective boundaries for each of the plurality of partitions.

15. The computer-readable, non-transitory storage medium as recited in claim 14, wherein automatically applying the effect within each of the plurality of partitions of the image further comprises determining intermediate parameter values between the respective boundaries for each of the plurality of partitions.

16. The computer-readable, non-transitory storage medium as recited in claim 14, wherein, in automatically applying the effect within each of the plurality of partitions of the image based on the one or more parameter values at the respective boundaries for each of the plurality of partitions, the one or more parameter values are linearly interpolated between the respective boundaries for each of the plurality of partitions.

17. The computer-readable, non-transitory storage medium as recited in claim 14, wherein, in automatically applying the effect within each of the plurality of partitions of the image based on the one or more parameter values at the respective boundaries for each of the plurality of partitions, the one or more parameter values are non-linearly interpolated between the respective boundaries for each of the plurality of partitions.

18. The computer-readable, non-transitory storage medium as recited in claim 14, wherein the program instructions are further computer-executable to implement:

receiving input specifying one or more key locations on a second spatial coordinate line, wherein the second spatial coordinate line corresponds to the second spatial dimension of the image, and wherein the boundaries for the plurality of partitions of the image are further determined by the one or more key locations on the second spatial coordinate line; and receiving input specifying one or more respective parameter values for the effect at each of the one or more key locations on the second spatial coordinate line.

19. The computer-readable, non-transitory storage medium as recited in claim 18, wherein, in automatically applying the effect within each of the plurality of partitions of the image based on the one or more parameter values at the respective boundaries for each of the plurality of partitions, the parameter values at each of the one or more key locations on the first spatial coordinate line are assigned a different weight than the parameter values at each of the one or more key locations on the second spatial coordinate line.

20. The computer-readable, non-transitory storage medium as recited in claim 18, wherein, in automatically applying the effect within each of the plurality of partitions of the image based on the one or more parameter values at the respective boundaries for each of the plurality of partitions, the parameter values at each of the one or more key locations on the first spatial coordinate line are assigned a different priority than the parameter values at each of the one or more key locations on the second spatial coordinate line.

21. The computer-readable, non-transitory storage medium as recited in claim 14, wherein the image comprises a third spatial dimension.

22. The computer-readable, non-transitory storage medium as recited in claim 21, wherein the program instructions are further computer-executable to implement:

receiving input specifying one or more key locations on a third spatial coordinate line, wherein the third spatial coordinate line corresponds to the third spatial dimension of the image, and wherein the boundaries for the plurality of partitions of the image are further determined by the one or more key locations on the third spatial coordinate line; and receiving input specifying one or more respective parameter values for the effect at each of the one or more key locations on the third spatial coordinate line.

23. The computer-readable, non-transitory storage medium as recited in claim 14, wherein the image comprises a frame in a digital video, wherein the digital video comprises a temporal dimension.

24. The computer-readable, non-transitory storage medium as recited in claim 23, wherein the program instructions are further computer-executable to implement:

receiving input specifying one or more keyframes on a timeline, wherein the timeline corresponds to the temporal dimension, and wherein the boundaries for the plurality of partitions of the image are further determined by the one or more keyframes on the timeline; and receiving input specifying one or more respective parameter values for the effect at each of the one or more keyframes on the timeline.

25. The computer-readable, non-transitory storage medium as recited in claim 14, wherein the program instructions are further computer-executable to implement:

applying a mask to the image to restrict a spatial scope of the effect.

26. The computer-readable, non-transitory storage medium as recited in claim 14, wherein the program instructions are further computer-executable to implement:

displaying the image and the first spatial coordinate line substantially simultaneously on one or more display devices.

27. A system, comprising:

at least one processor; and a memory coupled to the at least one processor, wherein the memory is configured to store an image comprising a first spatial dimension and a second spatial dimension, and wherein the memory is configured to store program instructions executable by the at least one processor to:

display a first spatial coordinate line, wherein the first spatial coordinate line corresponds to the first spatial dimension of the image;

receive input specifying one or more key locations on the first spatial coordinate line, wherein boundaries for a plurality of partitions of the image are determined by the one or more key locations on the first spatial coordinate line;

receive input specifying one or more respective parameter values for an effect at each of the one or more key locations on the first spatial coordinate line; and automatically apply the effect within each of the plurality of partitions of the image based on the one or more parameter values at the respective boundaries for each of the plurality of partitions.

28. The system as recited in claim 27, wherein, in automatically applying the effect within each of the plurality of partitions of the image, the program instructions are further executable by the at least one processor to determine intermediate parameter values between the respective boundaries for each of the plurality of partitions.

29. The system as recited in claim 27, wherein, in automatically applying the effect within each of the plurality of partitions of the image based on the one or more parameter values at the respective boundaries for each of the plurality of partitions, the one or more parameter values are linearly interpolated between the respective boundaries for each of the plurality of partitions.

30. The system as recited in claim 27, wherein, in automatically applying the effect within each of the plurality of partitions of the image based on the one or more parameter values at the respective boundaries for each of the plurality of partitions, the one or more parameter values are non-linearly interpolated between the respective boundaries for each of the plurality of partitions.

31. The system as recited in claim 27, wherein the program instructions are further executable by the at least one processor to:
  receive input specifying one or more key locations on a second spatial coordinate line, wherein the second spatial coordinate line corresponds to the second spatial dimension of the image, and wherein the boundaries for the plurality of partitions of the image are further determined by the one or more key locations on the second spatial coordinate line; and
  receive input specifying one or more respective parameter values for the effect at each of the one or more key locations on the second spatial coordinate line.

32. The system as recited in claim 31, wherein, in automatically applying the effect within each of the plurality of partitions of the image based on the one or more parameter values at the respective boundaries for each of the plurality of partitions, the parameter values at each of the one or more key locations on the first spatial coordinate line are assigned a different weight than the parameter values at each of the one or more key locations on the second spatial coordinate line.

33. The system as recited in claim 31, wherein, in automatically applying the effect within each of the plurality of partitions of the image based on the one or more parameter values at the respective boundaries for each of the plurality of partitions, the parameter values at each of the one or more key locations on the first spatial coordinate line are assigned a different priority than the parameter values at each of the one or more key locations on the second spatial coordinate line.

34. The system as recited in claim 27, wherein the image comprises a third spatial dimension.

35. The system as recited in claim 34, wherein the program instructions are further executable by the at least one processor to:
  receive input specifying one or more key locations on a third spatial coordinate line, wherein the third spatial coordinate line corresponds to the third spatial dimension of the image, and wherein the boundaries for the plurality of partitions of the image are further determined by the one or more key locations on the third spatial coordinate line; and
  receive input specifying one or more respective parameter values for the effect at each of the one or more key locations on the third spatial coordinate line.

36. The system as recited in claim 27, wherein the image comprises a frame in a digital video, wherein the digital video comprises a temporal dimension.

37. The system as recited in claim 36, wherein the program instructions are further executable by the at least one processor to:
  receive input specifying one or more keyframes on a timeline, wherein the timeline corresponds to the temporal dimension, and wherein the boundaries for the plurality of partitions of the image are further determined by the one or more keyframes on the timeline; and
  receive input specifying one or more respective parameter values for the effect at each of the one or more keyframes on the timeline.

38. The system as recited in claim 27, wherein the program instructions are further executable by the at least one processor to:
  apply a mask to the image to restrict a spatial scope of the effect.

39. The system as recited in claim 27, further comprising:
  one or more display devices;
  wherein the program instructions are further executable by the at least one processor to display the image and the first spatial coordinate line substantially simultaneously on the one or more display devices.

* * * * *